United States Patent
Ragupathi et al.

(10) Patent No.: US 10,097,409 B2
(45) Date of Patent: Oct. 9, 2018

(54) SYSTEM AND METHOD FOR MANAGING MULTI-TENANT CHASSIS ENVIRONMENT USING VIRTUAL PRIVATE CHASSIS MANAGEMENT CONTROLLERS

(71) Applicant: Dell Products, LP, Round Rock, TX (US)

(72) Inventors: Dinesh K. Ragupathi, Round Rock, TX (US); Ramsundar Govindarajan, Los Angeles, CA (US); Venkatesh Ramamoorthy, Round Rock, TX (US); Alaric Silveira, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 21 days.

(21) Appl. No.: 14/194,670

(22) Filed: Mar. 1, 2014

(65) Prior Publication Data

US 2015/0248315 A1    Sep. 3, 2015

(51) Int. Cl.
*H04L 12/24* (2006.01)
*H04L 12/64* (2006.01)

(52) U.S. Cl.
CPC ...... *H04L 41/0806* (2013.01); *H04L 12/6418* (2013.01)

(58) Field of Classification Search
None
See application file for complete search history.

(56) References Cited

U.S. PATENT DOCUMENTS

| | | | |
|---|---|---|---|
| 8,369,211 B2 | 2/2013 | Agarwal et al. | |
| 2005/0076107 A1* | 4/2005 | Goud | G06F 15/177 709/223 |
| 2006/0190380 A1* | 8/2006 | Force | G06Q 30/04 705/35 |
| 2007/0233455 A1* | 10/2007 | Zimmer | G06F 9/546 703/27 |
| 2010/0077067 A1* | 3/2010 | Strole | G06F 15/17393 709/223 |
| 2012/0159029 A1 | 6/2012 | Krishnan et al. | |
| 2012/0278599 A1* | 11/2012 | Nilakantan | H04L 67/34 713/2 |
| 2013/0046884 A1* | 2/2013 | Frost | G06Q 10/087 709/224 |
| 2014/0286345 A1* | 9/2014 | Mohandas | H04L 49/25 370/401 |
| 2014/0359615 A1 | 12/2014 | Chuang et al. | |

* cited by examiner

*Primary Examiner* — Vivek Srivastava
*Assistant Examiner* — Hien Doan
(74) *Attorney, Agent, or Firm* — Larson Newman, LLP

(57) ABSTRACT

An information handling system includes a chassis management controller (CMC) with a service processor, a processing system including a baseboard management controller (BMC) with a service processor, and a chassis management network coupled to the CMC and the BMC. The CMC instantiates a virtual CMC and the BMC instantiates a virtual BMC client. The virtual CMC is coupled to the virtual BMC client by a virtual management network of the chassis management network. The CMC is operable to manage the processing system via the BMC and the virtual CMC is operable to manage the processing system via the virtual BMC client.

13 Claims, 6 Drawing Sheets

SYSTEM AND METHOD FOR MANAGING MULTI-TENANT CHASSIS ENVIRONMENT USING VIRTUAL PRIVATE CHASSIS MANAGEMENT CONTROLLERS

FIELD OF THE DISCLOSURE

This disclosure relates generally to information handling systems, and more particularly relates to managing a multi-tenant chassis environment using virtual private chassis management controllers.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purpose of this disclosure an information handling system can be implemented on one or more information handling system. An information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An example of an information handling system includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 1:
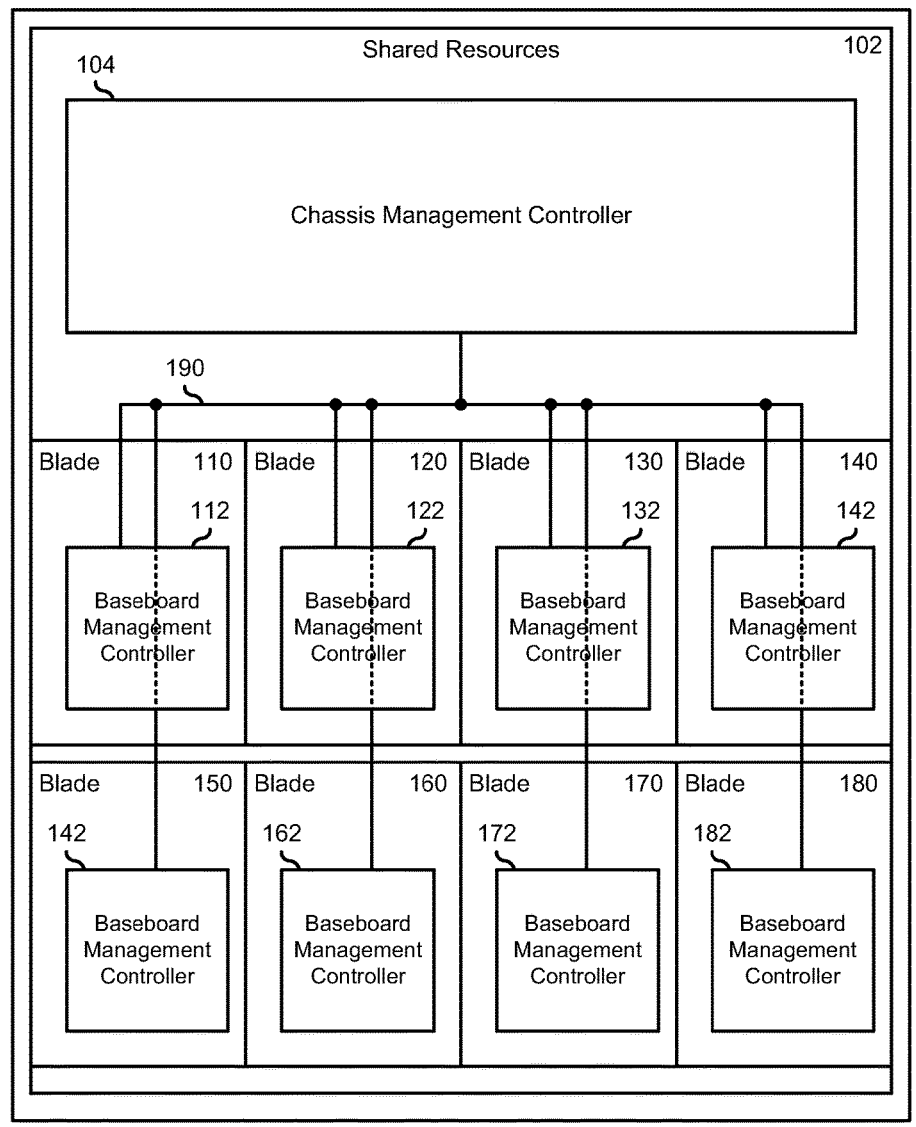
FIGS. 1 and 2 are block diagrams illustrating a multi-tenant chassis according to an embodiment of the present disclosure.
Figure 2:
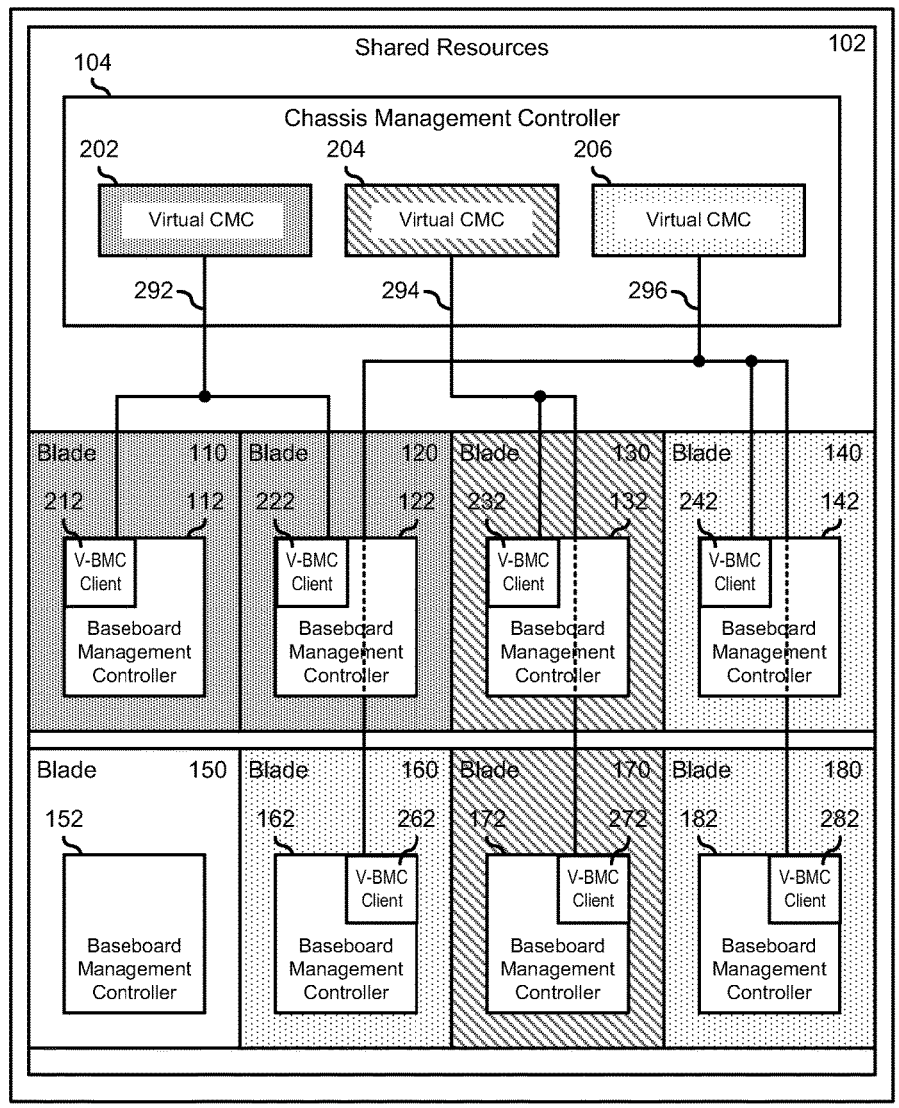

FIGS. 1 and 2 illustrate an embodiment of a multi-tenant chassis 100 including shared resources 102, a chassis management controller (CMC) 104, and blade servers 110, 120, 130, 140, 150, 160, 170, and 180. Shared resources 102 include one or more elements that provide a common function to each of blade servers 110, 120, 130, 140, 150, 160, 170, and 180. For example, shared resources 102 can include a common power supply for multi-tenant chassis 100 that provides power regulation and distribution for the multi-tenant chassis and to blade servers 110, 120, 130, 140, 150, 160, 170, and 180, one or more fans for providing cooling to the elements of the multi-tenant chassis, one or more input/output (I/O) controllers that provide connectivity between the blade servers and other network elements such as other chassis systems or servers in a shared rack or a datacenter, one or more storage controllers for providing a common data storage area for the blade servers, one or more PCIe cards, another shared resource, of a combination thereof.

CMC 104 operates as a separate service processor for monitoring the state of multi-tenant chassis 100. In particular, CMC 104 monitors physical parameters, hardware status, and operational states for the elements of multi-tenant chassis 100. An example of a physical parameter includes an operating temperature within multi-tenant chassis 100, shared resources 102, or blade servers 110, 120, 130, 140, 150, 160, 170, and 180, a voltage level provided by a power supply of the multi-tenant chassis, a fan speed for the power supply or the blade servers, other physical parameters in the multi-tenant chassis, or a combination thereof. An example of a hardware status includes a fault indication from shared resources 102, or blade servers 110, 120, 130, 140, 150, 160, 170, and 180, a data log, another hardware status, or a combination thereof. An example of an operational state includes a BIOS or firmware state of blade servers 110, 120, 130, 140, 150, 160, 170, and 180, an operating system state of the blade servers, a program status of a program running on the blade servers, another operational state, or a combination thereof. CMC 104 also provides out-of-band management for multi-tenant chassis 100 and for shared resources 104. For example, CMC 104 can operate to provide firmware updates to one or more elements of shared resources 102, to cycle power to multi-tenant chassis 100, to monitor a security status for multi-tenant chassis 100 and the shared resources, such as a firmware or BIOS checksum or a firmware or BIOS write authentication key, or the like, or a combination thereof.

Blade servers 110, 120, 130, 140, 150, 160, 170, and 180 operate to provide scalable processing capacity for performing various data processing tasks as needed by various tenants of multi-tenant chassis 100. For example, a particular tenant or user of multi-tenant chassis 100 can operate a web server on one or more of blade servers 110, 120, 130, 140, 150, 160, 170, and 180, and another tenant can operate a database server on one or more different blade servers.

Each of blade servers 110, 120, 130, 140, 150, 160, 170, and 180 includes a respective baseboard management controller (BMC) 112, 122, 132, 142, 152, 162, 172, and 182. BMCs 112, 122, 132, 142, 152, 162, 172, and 182 each operate similarly to CMC 104 within their respective blade servers 110, 120, 130, 140, 150, 160, 170, and 180. For example, blade server 110 can include resources such as one or more cooling fans, processors, I/O controllers, storage controllers or storage devices, PCIe cards, other resource, of a combination thereof. In this case, BMC 112 operates as a separate service processor for monitoring the physical parameters, hardware status, and operational states for the elements of blade server 100. BMCs 112, 122, 132, 142, 152, 162, 172, and 182 also provide out-of-band management for their respective blade servers 110, 120, 130, 140, 150, 160, 170, and 180.

CMC 104 is connected to BMCs 112, 122, 132, 142, 152, 162, 172, and 182 via a chassis management network 190. In this way, CMC 104 communicates with BMCs 112, 122, 132, 142, 152, 162, 172, and 182 and the CMC operates as a single management point for managing blade servers 110, 120, 130, 140, 150, 160, 170, and 180. In a particular embodiment, CMC 102 is connected to a management network that includes a management system for providing a single management point for multi-tenant chassis 100, and one or more additional information handling systems, such as a multi-tenant chassis similar to multi-tenant chassis 100, a rack server, or another information handling system, as needed or desired. Here, a datacenter administrator can manage shared resources 102 directly by accessing CMC 104, and can manage blade servers 110, 120, 130, 140, 150, 160, 170, and 180 indirectly by accessing respective BMCs 112, 122, 132, 142, 152, 162, 172, and 182 over chassis management network 190 from the CMC. In this way, the datacenter administrator can monitor the physical parameters, hardware status, and operational states, and can provide out-of-band management for one or more of shared resources 104 and blade servers 110, 120, 130, 140, 150, 160, 170, and 180.

In FIG. 2, multi-tenant chassis 100 is illustrated as managing a multi-tenant chassis environment using virtual private CMCs. In particular, CMC 104 is configured to be partitioned into virtual private CMCs 202, 204, and 206, each of which provides a virtualized and segmented version of the functionality of the CMC to one or more of blade servers 110, 120, 130, 140, 150, 160, 170, and 180. Here, each of BMCs 112, 122, 132, 142, 152, 162. 172, and 182 are configured to be partitioned into a respective virtual BMC client 212, 222, 232, 242, 252, 262, 272, and 282, each of which provides a virtualized and segmented version of the functionality of a BMC to one of virtual private CMCs 202, 204, and 206. In this way, each tenant of multi-tenant chassis 100 has the individual ability to monitor the physical parameters, hardware status, and operational states for, and to provide out-of-band management of the elements of multi-tenant chassis 100 that are allocated to the tenant. Virtual private CMCs 202, 204, and 206 each operate to establish a respective virtual chassis management network 292, 294, and 296 that are implemented over chassis management network 190. Virtual chassis management networks 292, 294, and 296 represent secure, private channels that are established over chassis management network 190, such that network traffic on the chassis management network that is associated with one of virtual private CMCs 202, 204, or 206 is partitioned to an associated one or more virtual BMC clients 212, 222, 232, 242, 252, 262, 272, and 282.

Thus, as illustrated, a first tenant is allocated blade servers 110 and 120, virtual private CMC 202 is instantiated on CMC 104, virtual BMC client 212 is instantiated on BMC 112, and virtual BMC client 222 is instantiated on BMC 222, and a virtual chassis management network 292 is established over chassis management network 190 that connects the virtual private CMC to the virtual BMC clients. Similarly, a second tenant is allocated blade servers 130 and 170 and a virtual chassis management network 294 is established over chassis management network 190 that connects virtual private CMC 204 to virtual BMC clients 232 and 272, and a third tenant is allocated blade servers 140, 160, and 180 and a virtual chassis management network 296 is established over chassis management network 190 that connects virtual private CMC 206 to virtual BMC clients 242, 272, and 282. As illustrated, blade server 150 is not allocated to one of the tenants, but this is not necessarily so. Here, blade server 150 can be reserved as a fail-over spare blade server, or can be utilized as a virtualization manager for multitenant chassis 100, as needed or desired. As such, management and monitoring of blade server 150 can be performed as described above by CMC 104.

Note that multi-tenant chassis 100 appears to a management network as four distinct CMCs: CMC 104 that is connected via chassis management network 190 to blade servers 110, 120, 130, 140, 150, 160, 170, and 180, virtual private CMC 202 that is connected via virtual chassis management network 292 to blade servers 110 and 120, virtual private CMC 204 that is connected via virtual chassis management network 294 to blade servers 130 and 170, and virtual private CMC 206 that is connected via virtual chassis management network 296 to blade servers 140, 160, and 180. In this way, the functions and features of multi-tenant chassis 100 that can be managed and monitored as common functions to all tenants can be managed via CMC 104, and the functions and features of the multi-tenant chassis that are particular to the tenants can be managed via their respective virtual private CMCs 202, 204, and 206. For example, common functions and features of shared resources 102 and blade servers 110, 120, 130, 140, 150, 160, 170, and 180 can include alert and log monitoring for all hardware in multi-tenant chassis 100, firmware upgrades for the hardware elements, such as BIOS or EFI updates, option ROM or ROM BIOS updates, and the like, other functions or features of multi-tenant chassis 100, or a combination thereof. Further, functions and features of multi-tenant chassis 100 that are particular to the tenants can include changes to the operating environment, such as operating system or virtual machine manager upgrades and patches, software upgrades and patches, other functions and features that may be particular to a tenant, or a combination thereof.

Figure 3:
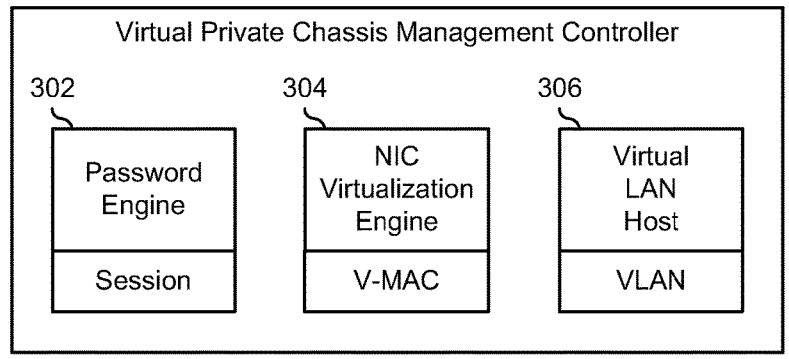
FIG. 3 is a block diagram illustrating a virtual private chassis management controller according to an embodiment of the present disclosure.

FIG. 3 illustrates a virtual private CMC 300 similar to one of virtual private CMCs 202, 204, or 206. As such, virtual private CMC 300 operates to establish a virtual chassis management network over an associated chassis management network similar to chassis management network 190. The virtual chassis management network represents a secure, private channel that is established over the chassis management network to an associated virtual BMC client. Virtual private CMC 300 includes a password engine 302, a network interface virtualization engine 304, and a virtual local area network (VLAN) host 306. Password engine 302 operates to provide the virtual chassis management network by establishing a user logon session between virtual private CMC 300 and one or more associated virtual BMC clients. As such, each virtual BMC client can be provided with user credentials, such as a username and password pair that authenticates the virtual BMC clients onto virtual private CMC 300. Thus password engine 302 provides a simple network infrastructure for establishing the virtual chassis management network. Network interface virtualization engine 304 operates to provide the virtual chassis management network by establishing a virtual address scheme, such as a virtual MAC address or virtual IP address associated with virtual private CMC 300 and that is accessible to the one or more associated virtual BMC clients. VLAN host 306 operates to provide the virtual chassis management network by establishing a VLAN tunnel to the one or more associated virtual BMC clients. VLAN host 306 provides a higher level of security for communications on the virtual chassis management network than is provided by network interface virtualization engine 304 or by password engine 302. The skilled artisan will recognize that virtual private CMC 300 can include a subset of password engine 302, network interface virtualization engine 304, and VLAN host 306, as needed or desired. Furthermore, a CMC similar to CMC 104 can include the functionality of virtual private CMC 300 as separate devices or modules, or as an integrated function of the CMC.

Figure 4:
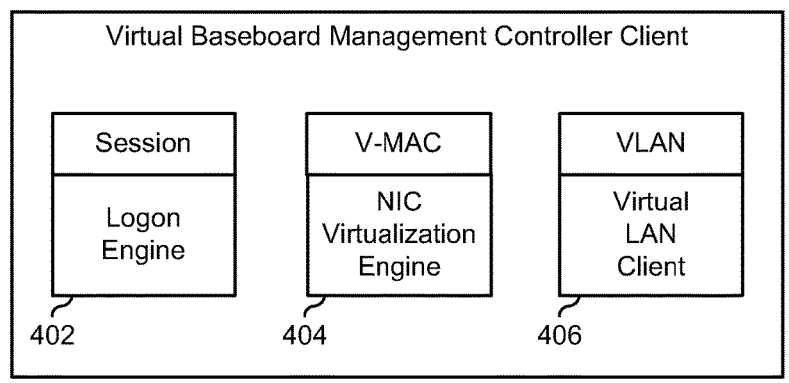
FIG. 4 is a block diagram illustrating a virtual baseboard management controller client according to an embodiment of the present disclosure.

FIG. 4 illustrates a virtual BMC client 400 similar to one of virtual BMC clients 212, 222, 232, 242, 252, 262, 272, and 282. Virtual BMC client 400 includes a logon engine 402, a network virtualization engine 404, and a VLAN client 406. Logon engine 402 includes user credentials that can be provided to a password engine similar to password engine 302. Network interface virtualization engine 404 is similar to network interface virtualization engine 304, and operates to establish a virtual MAC address or virtual IP address for virtual BMC client 400. VLAN client 406 operates establish a VLAN tunnel. The skilled artisan will recognize that virtual BMC client 400 can include a subset of logon engine 402, network interface virtualization engine 404, and VLAN client 406, as needed or desired. Furthermore, a BMC similar to one of BMCs 112, 122, 132, 142, 152, 162, 172, and 182 can include the functionality of virtual BMC client 400 as separate devices or modules, or as an integrated function of the associated BMC.

Figure 5:
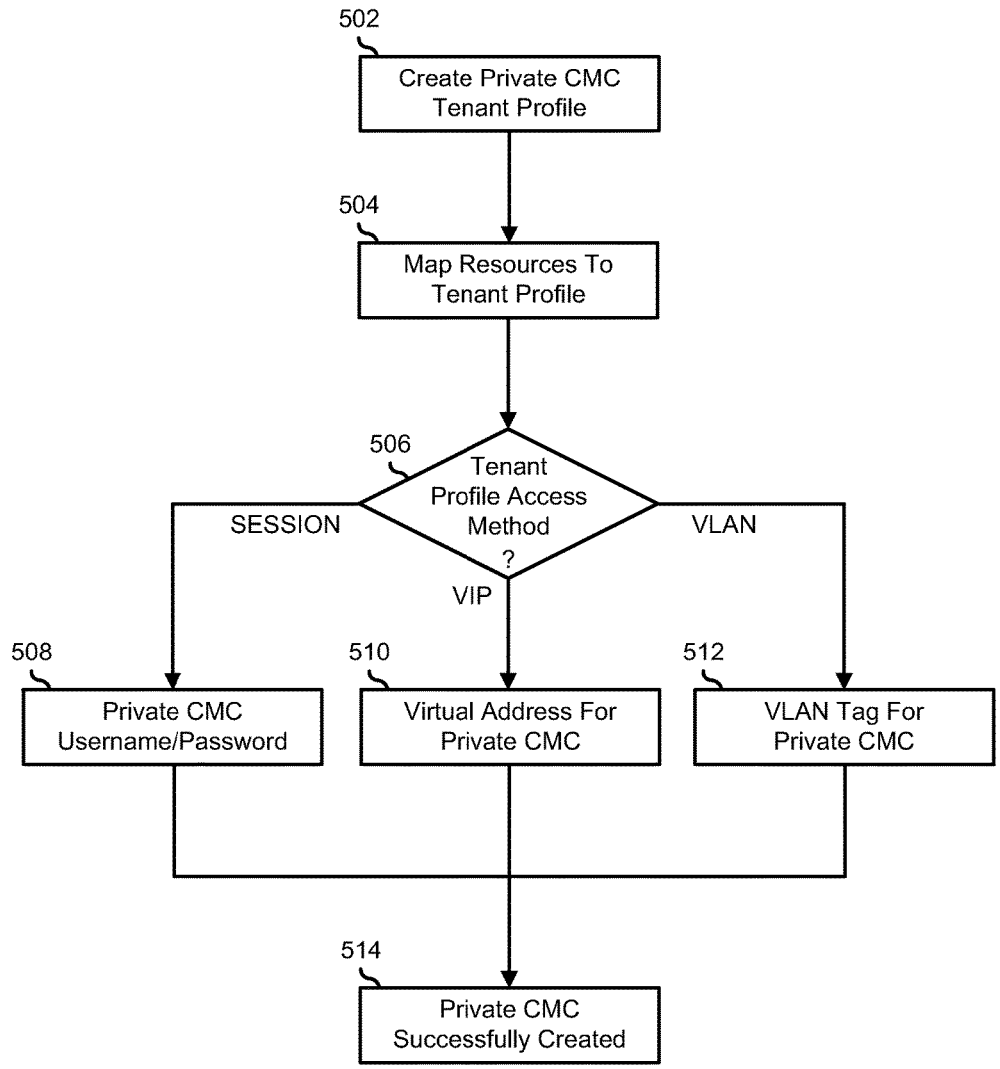
FIGS. 5 and 6 are flowcharts illustrating a method for managing a multi-tenant chassis environment using virtual private chassis management controllers according to an embodiment of the present disclosure.

FIG. 5 illustrates a method of creating a private CMC on a multi-tenant chassis similar to multi-tenant chassis 100. A virtual private CMC tenant profile is created in block 502. For example, an administrator can determine that a new tenant is to be allocated resources in a multi-tenant chassis, and can create a profile name, and add information to a profile template that identifies the tenant. Resources are mapped to the private CMC tenant profile in block 504. Here, one or more blade servers can be allocated to the use of the tenant, and the allocated blade servers can be associated with the private CMC tenant profile. An access method for accessing the allocated resources is selected in decision block 506. If a session-based access is selected, the "SESSION" branch of decision block 506 is taken, and the private CMC tenant profile is assigned a username and password for accessing the resources in block 508, and the private CMC tenant profile is successfully created in block 514. Here, the username and password can be provided to a virtual BMC client in the BMCs of the allocated blade servers. If a virtual address-based access is selected, the "VIP" branch of decision block 506 is taken, and the virtual private CMC is assigned a virtual address and the virtual BMC clients for the blade servers are assigned virtual addresses for accessing the resources in block 510, and the private CMC tenant profile is successfully created in block 514. Here, the virtual addresses can include virtual MAC addresses, virtual IP addresses, or the like, as needed or desired. If a VLAN-based access is selected, the "VLAN" branch of decision block 506 is taken, and the private CMC tenant profile is assigned a VLAN tag for accessing the resources in block 512, and the private CMC tenant profile is successfully created in block 516.

Figure 6:
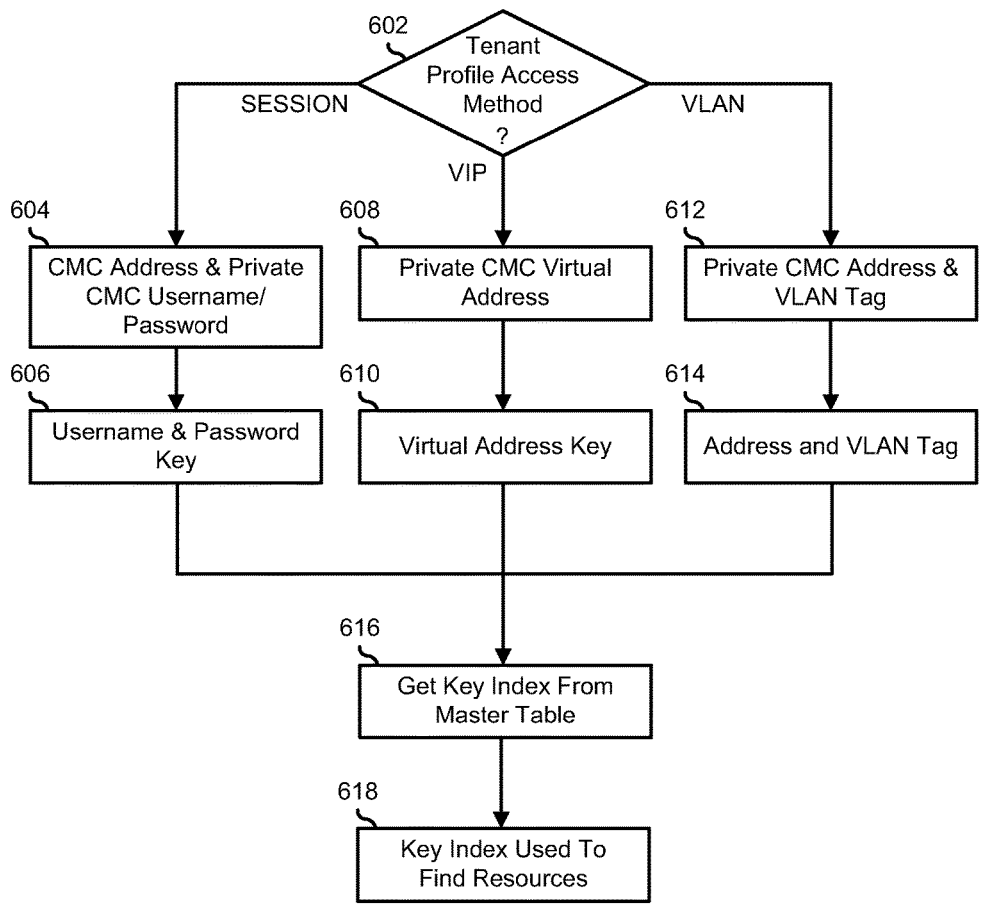

FIG. 6 illustrates a method of accessing resources of a private CMC on a multi-tenant chassis similar to multi-tenant chassis 100. An access method for accessing a virtual private CMC tenant profile is determined in decision block 602. If the virtual private CMC tenant profile specifies session-based access, the "SESSION" branch of decision block 602 is taken, and a logon sessions is provided that prompts a tenant for the username and password for accessing the resources in block 604, and upon receipt of the correct username and password a key to is provided to access the resources of the virtual private CMC in block 606. If the virtual private CMC tenant profile specifies virtual address-based access, the "VIP" branch of decision block 602 is taken, and the virtual private CMC is accessed using the virtual addressed for the virtual private CMD and the virtual BMC clients in block 608, and the access to the virtual private CMC is utilized as the key in block 610. If the virtual private CMC tenant profile specifies VLAN-based access, the "VLAN" branch of decision block 602 is taken, and the virtual private CMC is accessed using the VLAN tag in block 612, and the VLAN tag is utilized as the key in block 614. After a key is obtained in one of blocks 606, 610, or 614, a key index that is based upon the key is retrieved from a master table in block 616, and the key index is used to find the allocated resource of the virtual private CMC in block 618.

In a particular embodiment, the method of FIG. 5 is performed by a datacenter administrator by accessing a CMC similar to CMC 104, or via a management system that is connected to the CMC via a management network. In either case, the skilled artisan will understand that a graphical user interface with pre-determined options for access methods, access levels, and the like, can be implemented to permit the datacenter administrator to create private CMCs as described above. In another embodiment, the method of FIG. 5 is performed automatically when a new tenant is allocated resources on a multi-tenant chassis, or when a resource allocation for a tenant changes, such as by associating a new blade server to a tenant or by disassociating an already allocated blade server from the tenant.

In a particular embodiment, a BMC similar to BMCs 112, 122, 132, 142, 152, 162, 172, and 182 operates to provide more than one associated virtual BMC client. In this way, a tenant can be assigned resources not only on a blade server level, but also on a virtual machine level, and a virtual private CMC can be established for a particular tenant that has the ability to monitor and manage allocated blade servers within the multi-tenant chassis, and also to monitor and manage the environment and the programs running on an allocated virtual machine operating within a blade server. In another embodiment, a management server operates to provide a virtual private CMC that incorporates information handling systems that are separate, such as blade servers in two or more separate multi-tenant chassis, stand alone rack servers, or other information handling systems in a data center. In a particular embodiment one or more of the CMCs and BMCs described herein include a Integrated Dell Remote Access Controller (iDRAC).

Figure 7:
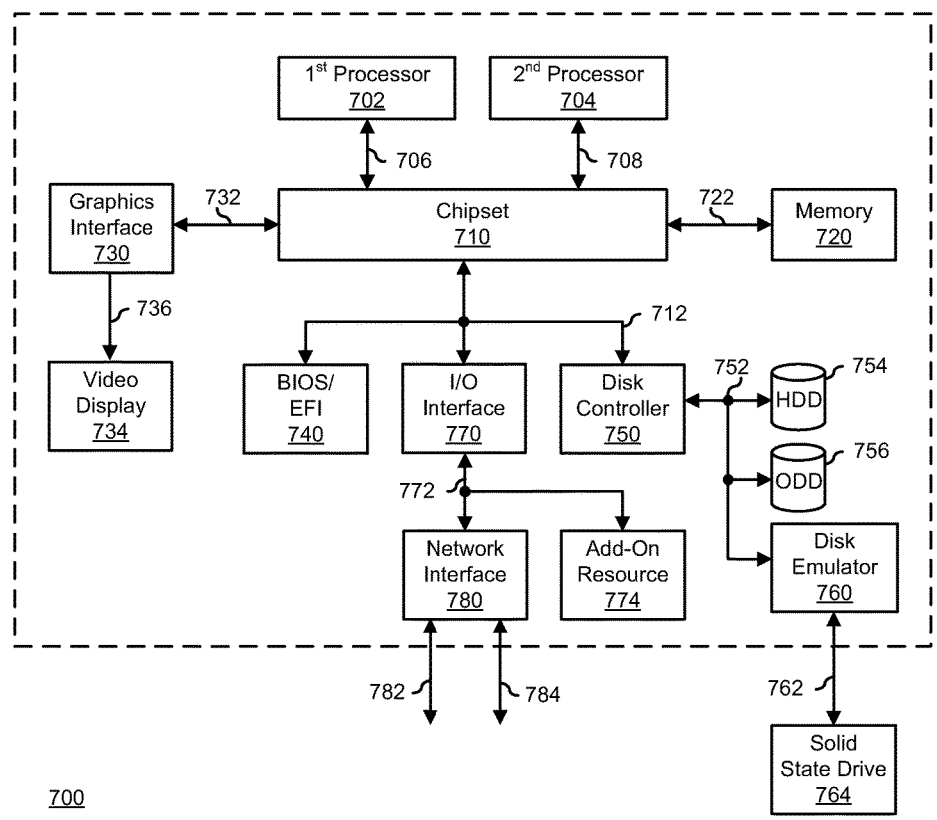
FIG. 7 is a block diagram illustrating a generalized information handling system according to an embodiment of the present disclosure.

FIG. 7 illustrates a generalized embodiment of information handling system 700. For purpose of this disclosure information handling system 700 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display. Information handling system 700 can also include one or more buses operable to transmit information between the various hardware components.

Information handling system 700 can include devices or modules that embody one or more of the devices or modules described above, and operates to perform one or more of the methods described above. Information handling system 700 includes a processors 702 and 704, a chipset 710, a memory 720, a graphics interface 730, include a basic input and output system/extensible firmware interface (BIOS/EFI) module 740, a disk controller 750, a disk emulator 760, an input/output (I/O) interface 770, and a network interface 780. Processor 702 is connected to chipset 710 via processor interface 706, and processor 704 is connected to the chipset via processor interface 708. Memory 720 is connected to chipset 710 via a memory bus 722. Graphics interface 730 is connected to chipset 710 via a graphics interface 732, and provides a video display output 736 to a video display 734. In a particular embodiment, information handling system 700 includes separate memories that are dedicated to each of processors 702 and 704 via separate memory interfaces. An example of memory 720 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 740, disk controller 750, and I/O interface 770 are connected to chipset 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 710 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 740 includes BIOS/EFI code operable to detect resources within information handling system 700, to provide drivers for the resources, initialize the resources, and access the resources. BIOS/EFI module 740 includes code that operates to detect resources within information handling system 700, to provide drivers for the resources, to initialize the resources, and to access the resources.

Disk controller 750 includes a disk interface 752 that connects the disc controller to a hard disk drive (HDD) 754, to an optical disk drive (ODD) 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits a solid-state drive 764 to be connected to information handling system 700 via an external interface 762. An example of external interface 762 includes a USB interface, an IEEE 1394 (Firewire) interface, a proprietary interface, or a combination thereof. Alternatively, solid-state drive 764 can be disposed within information handling system 700.

I/O interface 770 includes a peripheral interface 772 that connects the I/O interface to an add-on resource 774 and to network interface 780. Peripheral interface 772 can be the same type of interface as I/O channel 712, or can be a different type of interface. As such, I/O interface 770 extends the capacity of I/O channel 712 when peripheral interface 772 and the I/O channel are of the same type, and the I/O interface translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as chipset 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising: a hardware chassis management controller (CMC) comprising a first service processor, wherein the hardware CMC instantiates a first virtual CMC and a second virtual CMC:
   a first processing system including a first hardware baseboard management controller (BMC) comprising a second service processor, wherein the first hardware BMC instantiates a first virtual BMC client;
   a second processing system including a second hardware BMC having a third service processor, wherein the second hardware BMC instantiates a second virtual BMC client: and
   a chassis management network coupled to the hardware CMC, the first hardware BMC and the second hardware BMC;
   wherein:
   the first virtual CMC is coupled to the first virtual BMC client by a first virtual management network of the chassis management network, wherein the first virtual management network is provided between the first virtual CMC and the first virtual BMC client based on a logon session;
   the hardware CMC manages the first processing system via the first hardware BMC;
   the first virtual CMC manages the first processing system via the first virtual BMC client:
   the second virtual CMC is coupled to the second virtual BMC client by a second virtual management network of the chassis management network;
   the hardware CMC manages the second processing system via the second hardware BMC: and
   the second virtual CMC manages the second processing system via the second virtual BMC client.

2. The information handling system of claim 1, further comprising:
   a third processing system including a third hardware BMC having a fourth service processor, wherein the third BMC instantiates a third virtual BMC client;
   wherein:
   the first virtual CMC is coupled to the third virtual BMC client by the first virtual management network; and
   the first virtual CMC manages the third processing system via the second third virtual BMC client.

3. The information handling system of claim 1, wherein the first virtual management network is provided between the first virtual CMC and the first virtual BMC client based on a virtual address.

4. The information handling system of claim 3, wherein the virtual address comprises one of a virtual Internet Protocol address or a Media Access Control address.

5. The information handling system of claim 1, wherein the first virtual management network is provided between the first virtual CMC and the first virtual BMC client based on a virtual local-area network tag.

6. A method comprising:
   instantiating a first virtual chassis management controller (CMC) on a master hardware CMC of an information handling system; instantiating a second virtual CMC on the master hardware CMC; instantiating a first virtual baseboard management controller (BMC) client on a first master hardware BMC of a first processing system of the information handling system, wherein the master hardware CMC is coupled to the first master hardware BMC via a first chassis management network;
   instantiating a second virtual BMC client on a second master hardware BMC of a second processing system of the information handling system, wherein the master hardware CMC is coupled to the second master hardware BMC via a second chassis management network;
   instantiating a first virtual management network on the chassis management network, wherein the first virtual CMC is coupled to the first virtual BMC client via the first virtual management network; wherein the first virtual management network is provided between the first virtual CMC and the first virtual BMC client based on a logon session
   instantiating a second virtual management network on the chassis management network, wherein the second virtual CMC is coupled to the second virtual BMC client via the second virtual management network;
   managing, from the master hardware CMC, the first processing system via the first master hardware BMC;
   managing, from the first virtual CMC, the first processing system via the first virtual BMC client; and
   managing, from the second virtual CMC, the second processing system via the second virtual BMC client.

7. The method of claim 6, further comprising:
   instantiating a third virtual BMC client on a third master hardware BMC of a third processing system of the information handling system, wherein the first virtual CMC is coupled to the third virtual BMC client via the first virtual management network; and managing, from the first virtual CMC, the third processing system via the third virtual BMC client.

8. The method of claim 6, wherein the first virtual management network is provided between the first virtual CMC and the first virtual BMC client based on a virtual address.

9. The method of claim 6, wherein the first virtual management network is provided between the first virtual CMC and the first virtual BMC client based on a virtual local-area network tag.

10. A non-transitory computer-readable medium including code for performing a method, the method comprising:

instantiating a first virtual chassis management controller (CMC) on a master hardware CMC of an information handling system; instantiating a second virtual CMC on the master hardware CMC: instantiating a first virtual baseboard management controller (BMC) client on a first master hardware BMC of a first processing system of the information handling system, wherein the master hardware CMC is coupled to the first master hardware BMC via a first chassis management network; instantiating a second virtual BMC client on a second master hardware BMC of a second processing system of the information handling system, wherein the master hardware CMC is coupled to the second master hardware BMC via a second chassis management network:

instantiating a first virtual management network on the chassis management network, wherein the first virtual CMC is coupled to the first virtual BMC client via the first virtual management network; wherein the first virtual management network is provided between the first virtual CMC and the first virtual BMC client based on a logon session, instantiating a second virtual management network on the chassis management network, wherein the second virtual CMC is coupled to the second virtual BMC client via the second virtual management network:

managing, from the master hardware CMC, the first processing system via the first master hardware BMC;

managing, from the first virtual CMC, the first processing system via the first virtual BMC client: and managing, from the second virtual CMC, the second processing system via the second virtual BMC client.

11. The computer-readable medium of claim 10, the method further comprising:

instantiating a third virtual BMC client on a third master BMC of a third processing system of the information handling system, wherein the first virtual CMC is coupled to the third virtual BMC client via the first virtual management network; and managing, from the first virtual CMC, the third processing system via the first third virtual BMC client.

12. The computer-readable medium of claim 10, wherein the first virtual management network is provided between the first virtual CMC and the first virtual BMC client based on a virtual address.

13. The computer-readable medium of claim 10, wherein the first virtual management network is provided between the first virtual CMC and the first virtual BMC client based on a virtual local-area network tag.

* * * * *